United States Patent Office 3,443,927
Patented May 13, 1969

3,443,927
HERBICIDAL MIXTURE AND METHOD OF CONTROLLING UNDESIRABLE PLANT GROWTH THEREWITH
Victor H. Unger, Willow Grove, Pa., assignor to Rohm and Haas Company, Philadelphia, Pa., a corporation of Delaware
No Drawing. Filed Mar. 24, 1967, Ser. No. 625,620
Int. Cl. A01n 9/14
U.S. Cl. 71—103                                                   10 Claims

ABSTRACT OF THE DISCLOSURE

Herbicidal compositions which comprise a mixture of 3′,4′-dichloropropionanilide and 4-methylsulfonyl-2,6-dinitro-N,N-dipropylaniline, and a method of controlling undesirable plant growth with them.

BACKGROUND OF THE INVENTION

This invention relates to herbicidal compositions. In particular it concerns compositions comprising mixtures of 3′,4′-dichloropropionanilide and 4-methylsulfonyl-2,6-dinitro-N,N-dipropylaniline.

3′,4′-Dichloropropionanilide is a selective post-emergence herbicide which has achieved prominence for the control of weeds among agronomic crops. Its preparation and herbicidal use are described in British Patent 903,766. A formulation of 3′,4′-dichloroprropionanilide is available commercially under the trademark of Stam herbicides. Its most extensive use is for weed control in rice.

4-Methylsulfonyl-2,6-dinitro-N,N-dipropylaniline is a selective herbicide which is particularly noted for pre-emergence activity. Its preparation and herbicidal use are described in U.S. Patent 3,227,734. It is commercially available under the trademark of Planavin herbicides. It is particularly useful for control of weeds in cotton and soybeans.

The farmer, horticulturist, or any other grower of useful and desirable plants needs an arsenal of herbicides to fit a large number of situations wherein undesirable vegetation requires controlling. An ideal herbicide would be one which gives full season selective weed control with a single application. It should be able to control all common weeds, killing them as the seed, the germinant seed, the seedling, or the established plant and at the same time various types of crops would be tolerant. As with ideals in general, it could not be expected that such an ideal herbicide would be readily achieved, if ever. Certainly, today no herbicide exists which comes even close to these requirements. Unexpectedly, we have found a way to approach this ideal by admixing two separate herbicidal materials. The new and improved herbicidal properties of the resulting composition could not be predicted on the basis of the known properties of the individual components.

It has previously been known that either 3′,4′-dichloropropionanilide or 4-methylsulfonyl-2,6-dinitro-N,N-diproplyaniline could be combined with or used in conjunction with other herbicides. In most instances the mere additive herbicidal properties of the individual components are observed. Occasionally unpredictable properties of the combination is observed as for example in the inventions of U.S. Patents 3,134,666 and 3,154,398.

SUMMARY OF THE INVENTION

It has been found that mixtures of 3′,4′-dichloropropionanilide and 4-methylsulfonyl-2,6-dinitro-N,N-dipropylaniline give weed kills which are much greater than would be predicted on the basis of the kills achieved with the individual components. This is particularly valuable for the control of weeds in rice. Planavin can be used for the pre-emergence control of grassy weeds in drilled rice, but it is prohibitively injurious to surface seeded rice. The Stam-Planavin herbicide combination can be used on rice grown by any cultural method and thus the usefulness of the two types of herbicides is greatly extended.

Both 3′,4′-dichloropropionanilide and 4-methylsulfonyl-2,6-dinitro-N,N-dipropylaniline may be used as solutions in common organic solvents or as formulations. Typical formulations are liquid such as emulsifiable concentrates, solid such as dusts or wettable powders, or a solid dispersed in a liquid such as a flowable emulsion. The two herbicides of this invention may be combined together in a single solution or formulation or they may be added as separate solutions or formulations to a spray tank prior to application of the mixture.

The ratio of the 3′,4′-dichloropropionanilide to the 4-methylsulfonyl-2,6-dinitro-N,N-dipropylaniline in such solutions and formulations is usually in the range of 1:6 to 24:1 parts by weight. A preferred range of ratios is 1:2 to 8:1.

Solutions of the two herbicides in an organic solvent are particularly adapted to a low-volume method of application whereby the materials are dispersed as very fine particles, usually less than 400 microns in diameter, by either ground or aerial equipment. Such solutions would contain from 0.5 lb. to 6 lbs. of 3′,4′-dichloropropionanilide and from 0.25 to 3 lbs. of 4-methyl-sulfonyl-2,6-dinitro-N,N-dipropylaniline per gallon of solution. Numerous organic solvents or mixtures of such solvents may be used, the major criteria being adequate solubility of the two herbicides involved and lack of phytotoxicity to agronomic crops. Typical solvents which may be employed include ethers such as the monoalkyl ethers of ethylene glycol and diethylene glycol, ketones, such as cyclohexanone and isophorone, alcohols such as octyl alcohol and cyclohexanol, glycols such as propylene glycol and diethylene glycol, esters such as diethyl maleate, diethyl succinate, methyl oleate and dibutyl phthalate, amines such as tert-octadecylamine, amides such as dimethyl formamide, hydrocarbons such as diisopropylbenzene, and sulfoxides such as dimethyl sulfoxide. A typical example is

EXAMPLE 1

A solution was made by dissolving one pound of 3′,4′-dichloropropionanilide and one pound of 4-methylsulfonyl-2,6-dinitro-N,N-dipropylaniline in a 50:50 mixture of dibutyl phthalate and the monobutyl ether of ethylene glycol such that the total volume of the resulting solution was one gallon.

Emulsifiable concentrates are made by dissolving 3′,4′-dichloropropionanilide and 4-methylsulfonyl-2,6-dinitro-N,N-dipropylaniline in a water-imiscible solvent or mixture of solvents and adding one or more solvent-soluble emulsifying agents. Such concentrates will ordinarily contain from about 5% to about 60% by weight of the two active agents, from about 0.5% to about 15% by weight of the emulsifying agents and the remainder will be the solvent or solvent mixture. Typical solvents are found in the class of esters, such as dibutyl phthalate, hydrocarbons such as xylene and aromatic naphthas, and ketones such as mesityl oxide and isophorone. Emulsifying agents may be anionic, cationic or non-ionic in character. Typical emulsifying agents may be found in the publication by John W. McCutcheon entitled "Detergents and Emulsifiers-1964 Annual," published by John W. McCutcheon, Inc., Morristown, N.J. An example of preparing a typical emulsifiable concentrate is given below.

EXAMPLE 2

The ingredients listed below are thoroughly blended to give a homogeneous emulsifiable concentrate.

Ingredients: Parts by weight
- 3'-4'-dichloropropionanilide _____ 20
- 4-methylsulfonyl-2,6-dinitro-N,N-dipropylaniline _____ 20
- Nonylphenoxypolyethoxyethanol _____ 5
- Calcium dodecylbenzenesulfonate _____ 5
- Xylene _____ 20
- Mesityl oxide _____ 30

Often separate emulsifiable concentrates of the two active herbicidal components are made and then blended together to make the combined emulsifiable concentrate. For herbicidal applications the emulsifiable concentrate is mixed with water to give an aqueous dispersion.

Wettable powders may be made by mixing the active herbicides in a finely-divided solid carrier together with one or more surface active agents such as wetting, spreading and/or dispersing agents. The above referred to McCutcheon publication entitled "Detergents and Emulsifiers" lists typical surface active agents which are useful for this purpose. Typical solid carriers which are commonly used include silicaceous clays such as kaolin, diatomaceous earth, fuller's earth, magnesium lime and botanical materials such as sawdust. Typical wettable powders may contain from 10% to 80% by weight of the combined active ingredients, and from 1% to 10% of the surfactant with the remainder being the carrier. An example of a typical wettable powder is given below.

EXAMPLE 3

The following ingredients are blended in a mixer and the mix is micropulverized to a finely divided powder.

Ingredients: Parts by weight
- 3',4'-dichloropropionanilide _____ 25
- 4-methylsulfonyl-2,6-dinitro-N,N-dipropylaniline _____ 25
- Kaolinite clay _____ 47
- Sodium lignin sulfonate _____ 3

Wettable powders may be made by dissolving the active herbicidal ingredients in a readily volatile solvent such as acetone, mixing this solution with the carrier and allowing the solvent to evaporate. The average particle size of a typical wettable powder is usually less than 150 microns, preferably less than 25 microns.

Dust concentrates are made by incorporating the 3',4'-dichloropropionanilide and 4-methylsulfonyl-2,6-dinitro-N,N-dipropylaniline into a dust-type carrier. Typical of such carriers are talcs, finely particled clays, pyrophyllite, diatomaceous earth, magnesium carbonate, sulfur and botanical flours such as walnut shell flour. Dust concentrates containing from 20% to 80% of the toxicant are commonly prepared, but as used the dusts preferably contain from 1% to 20% of the active ingredient. The preparation of a typical dust concentrate is given below.

EXAMPLE 4

The following ingredients are thoroughly mixed and then ground to a fine particle size.

Ingredients: Parts by weight
- 3',4'-dichloropropionanilide _____ 15
- 4-methylsulfonyl-2,6-dinitro-N,N-dipropylaniline _____ 15
- Talc _____ 70

The average particle size of dust formulations is usually less than 150 microns. In any event they must be suitable for use in conventional dusting equipment. A dust at use concentration may be made by blending a dust concentrate or a wettable powder formulation with a typical dust carrier.

The compositions of this invention may be used for weed control by applying them to the locus to be protected from weeds, or as blanket treatments to tolerant crops or as directed applications to a growing crop, usually a row crop. Preferably the materials are applied after weeds have appeared. Generally a dosage of from one half to twenty pounds per acre of the combination of 3',4'-dichloropropionanilide and 4-methylsulfonyl- 2,6-dinitro-N,N-dipropylaniline is used. The preferred dosage range is two to eight pounds per acre. A solution containing the two active ingredients is usually applied as such, for example, as an aerosol type application or by low volume aerial application. Wettable powder and emulsifiable concentrates are usually extended with water and then applied by conventional sprayers. Rates of application vary from 1 to 200 gallons per acre.

If desired other pesticides or plant nutrients may be incorporated with the compositions of this invention.

A greenhouse method of evaluation was used to show the increased weed control of the combination of the two herbicides over that which would be predicted from the herbicidal activities of the individual components alone.

In this test an emulsifiable concentrate of 3',4'-dichloropropionanilide (Treatment A) containing three pounds of this active ingredient and a wettable powder containing 75% by weight of 4-methylsulfonyl-2,6-dinitro-N,N-dipropylaminline (Treatment B) were used. These two formulations were combined in aqueous sprays to give varying weight ratios of the active ingredients. A standard number of seeds of barnyardgrass (*Echinochloa crusgalli*) and of rice (*Oryza sativa* var. Blue Bonnet) were planted in a standard greenhouse soil mixture in 6 x 8 inch plastic trays and allowed to germinate and grow for sixteen days. At this time, additional seeds of barynardgrass were sown on the soil surface and covered with one-eighth inch of soil. The trays were then sprayed with aqueous sprays of the individual herbicides and various combinations thereof at a carrier volume of 50 gallons per acre. Untreated trays were included as a control. There were four replicates of treated and untreated trays. All trays were watered by subirrigation for the next seven days and thereafter were flooded. Twenty-one days after treatment the results of the test were observed. There was no discernible injury to the rice plants from any of the treatments whereas in general the barnyardgrass seedlings were severely injured or killed. The number of barnyardgrass plants surviving per 6 x 8 inch tray, i.e. per an area of 48 square inches was counted. The results are given in Table I.

TABLE I.—BARNYARDGRASS CONTROL

| Treatment | Active ingredient, lb./a. | No. of barnyardgrass plants per 48 square inches | Percent control |
|---|---|---|---|
| A | 2 | [1] 9.7 (1.026) | 88.2 |
|   | 4 | 12.3 (1.117) | 85 |
|   | 8 | 6.3 (0.840) | 92.4 |
| B | 0.5 | 54.7 (1.744) | 44 |
|   | 1 | 54.0 (1.730) | 35 |
|   | 2 | 45.0 (1.658) | 45 |
|   | 4 | 40.3 (1.608) | 51.3 |
| A+B | 2+0.5 | 5.7 (0.800) | 93.1 |
|   | 4+0.5 | 2.7 (0.460) | 96.7 |
|   | 2+1 | 4.0 (0.634) | 95.2 |
|   | 4+1 | 0.7 (0.201) | 99.2 |
|   | 4+2 | 1.3 (0.301) | 98.5 |
| Control LSD .05 |   | 82.3 (1.917) (0.251) |   |

[1] Data transformed to logarithms (based on individual replicates plus 1) for statistical evaluation.

This test is a measure of the weed control that can be achieved from the combination treatments when such treatments are applied to rice and barnyardgrass growing together as they normally do in most rice-producing areas of the world. The very poor weed control for the B Treatments reflects the fact that 4-methylsulfonyl-2,6-dinitro-N,N-dipropylaniline (Planavin) has almost no effect on merged weeds. Similarly the relatively poor weed control with the A Treatments reflects the fact that 3',4'-dichloropropionanilide (propanil) provides little or no pre-emergence weed control. Since Planavin cannot be used alone pre-emergence to rice and weeds in all rice producing areas because it severely injures rice in some situations and since lack of residual pre-emergence effectiveness renders propanil alone less than optimum in those situations where weeds germinate over an extended period of time, a combination of propanil and Planavin offers an opportunity to produce a degree of weed control and crop tolerance impossible with either material alone.

The advantage of the combination of the two active ingredients over results which would be predicted on the basis of the herbicidal activities of the individual components is particularly shown with the following excerpted data from Table I.

| Treatment | Lbs./a. | No. of plants/48 sq. in. |
|---|---|---|
| A | 4 | 12.3 |
| B | 1 | 54.0 |
| A+B | 4+1 | 0.7 |

On the basis of the controls obtained with the individual treatments, it is calculated that for the combination of 4 plus 1 pounds per acre of the two herbicides, there would have been 5.7 plants remaining in the 48 square inch area. Instead there was less than 1. In terms of yield of rice, this type of weed control is particularly critical. For example, in the United States Department of Agriculture Handbook No. 292, issued January, 1966 and entitled "Weeds and Their Control in Rice Production" it is stated on page 2, that a rice field containing 5 barnyardgrass plants per square foot yielded 3440 pounds per acre, whereas one containing 1 barnyardgrass plant per square foot yielded 4380 pounds per acre. Thus the greater weed control achieved by the combination of 4 pounds of 3',4'-dichloropropionanilide and 1 pound of 4-methylsulfonyl-2,6-dinitro-N,N-dipropylaniline over that obtained by the individual components at the same dosage means an increase in rice yield of almost 1000 pounds per acre.

The same considerations apply to other combinations of these two herbicides.

I claim:

1. A herbicidal composition comprising a herbicidally effective amount of an admixture of 3',4'-dichloropropionanilide and 4-methylsulfonyl-2,6-dinitro-N,N-dipropylaniline.

2. A composition according to claim 1 wherein the weight ratio of 3',4'-dichloropropionanilide to 4-methylsulfonyl-2,6-dinitro-N,N-dipropylaniline is in the range of 1:6 to 24:1.

3. A composition according to claim 1 wherein the weight ratio of 3',4'-dichloropropionanilide to 4-methylsulfonyl-2,6-dinitro-N,N-dipropylaniline is in the range of 1:2 to 8:1.

4. A composition according to claim 1 which additionally contains a solvent and at least one emulsifying agent, said composition being in the form of an emulsifiable concentrate.

5. A composition according to claim 1 which additionally contains a solid carrier and at least one surface active agent, said composition being in the form of a wettable powder.

6. A composition according to claim 1 which is in the form of an organic solution, said solution containing per gallon at least 0.5 pound of 3',4'-dichloropropionanilide and at least 0.25 pound of 4-methylsulfonyl-2,6-dinitro-N,N-dipropylanaline and being adaptable for herbicidal application by a low-volume technique.

7. A method of controlling weeds by applying to the locus to be controlled by herbicidal composition containing a herbicidally effective amount of a combination of 3',4'-dichloropropionanilide and 4-methylsulfonyl-2,6-dinitro-N,N-dipropylaniline.

8. A method of controlling weeds according to claim 7 wherein the said composition contains a weight ratio of 3',4'-dichloropropionanalide to 4-methylsulfonyl-2,6-dinitro-N,N-dipropylaniline in the range of 1:6 to 24:1.

9. A method of controlling weeks according to claim 7 wherein the said composition contains a weight ratio of 3',4'-dichloropropionanalide to 4-methylsulfonyl-2,6-dinitro-N,N-dipropylaniline in the range of 1:2 to 8:1.

10. A method of controlling weeds according to claim 7 wherein the said locus is a field containing growing rice.

References Cited
UNITED STATES PATENTS

| 3,134,666 | 5/1964 | McRae | 71—100 |
| 3,154,398 | 10/1964 | McRae | 71—118 |
| 3,227,734 | 1/1966 | Soloway et al. | 71—103 X |

JAMES O. THOMAS, Jr., *Primary Examiner.*

U.S. Cl. X.R.

71—118